US008533729B2

(12) United States Patent
Yao

(10) Patent No.: US 8,533,729 B2
(45) Date of Patent: Sep. 10, 2013

(54) DISTRIBUTED TASK SYSTEM AND DISTRIBUTED TASK MANAGEMENT METHOD

(75) Inventor: Jiandong Yao, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 737 days.

(21) Appl. No.: 11/997,351

(22) PCT Filed: Jan. 29, 2008

(86) PCT No.: PCT/US2008/052310
§ 371 (c)(1),
(2), (4) Date: Feb. 4, 2010

(87) PCT Pub. No.: WO2008/094907
PCT Pub. Date: Aug. 7, 2008

(65) Prior Publication Data
US 2010/0146516 A1    Jun. 10, 2010

(30) Foreign Application Priority Data
Jan. 30, 2007   (CN) .......................... 2007 1 0002961

(51) Int. Cl.
*G06F 9/46*   (2006.01)
*G06F 15/16*   (2006.01)
*G06F 15/173*   (2006.01)

(52) U.S. Cl.
USPC ............ 718/105; 718/104; 709/203; 709/226

(58) Field of Classification Search
USPC .............. 718/1–105; 709/201–203, 223–229
See application file for complete search history.

(56) References Cited

U.S. PATENT DOCUMENTS

| 4,394,727 A | 7/1983 | Hoffman et al. |
| 5,202,989 A * | 4/1993 | Hirosawa et al. ............. 718/105 |

(Continued)

FOREIGN PATENT DOCUMENTS

| CN | 1434393 A | 8/2003 |
| CN | 1480863 A | 3/2004 |

(Continued)

OTHER PUBLICATIONS

Chen et al, "Performance Evaluation of Service Differentiating Internet Servers" IEEE Transactions on Computers, IEEE Service Center, Los Alamitos, CA, US, vol. 51, No. 11, Nov. 1, 2002, 8 pages.

(Continued)

*Primary Examiner* — Abdullah Al Kawsar
(74) *Attorney, Agent, or Firm* — Lee & Hayes, PLLC

(57) ABSTRACT

A distributed task system has a task transaction server and at least one task server. Instead of being merely passively called by the task transaction server for executing a task, the task server performs self-balancing according to task execution conditions and operation conditions of the task server. The task transaction server receives task requests from the task server, records the execution conditions, and provides feedback to the task server, and the task server executes the task according to the received feedback and the operation conditions of the task server. The task transaction server may determine if the task server can execute the task according to the execution conditions of the task, and feedback to the task server. A self-balancing unit of the task server may further determine whether the task server is busy, and if not busy, trigger a task execution unit of the task server to execute the task.

14 Claims, 4 Drawing Sheets

(56) References Cited

U.S. PATENT DOCUMENTS

| | | |
|---|---|---|
| 5,710,918 A | 1/1998 | Lagarde et al. |
| 5,835,770 A | 11/1998 | Shum et al. |
| 6,389,448 B1 | 5/2002 | Primak et al. |
| 6,393,481 B1* | 5/2002 | Deo et al. ................ 709/224 |
| 6,728,961 B1* | 4/2004 | Velasco .................... 718/105 |
| 6,748,414 B1 | 6/2004 | Bournas |
| 6,938,087 B1 | 8/2005 | Abu-Samaha |
| 6,988,139 B1* | 1/2006 | Jervis et al. ............. 709/226 |
| 7,406,515 B1* | 7/2008 | Joyce et al. ............. 709/224 |
| 7,594,228 B2 | 9/2009 | Lam |
| 2002/0023122 A1* | 2/2002 | Polizzi et al. ............ 709/202 |
| 2002/0032777 A1 | 3/2002 | Kawata et al. |
| 2002/0049842 A1 | 4/2002 | Huetsch et al. |
| 2003/0037093 A1 | 2/2003 | Bhat et al. |
| 2003/0158940 A1* | 8/2003 | Leigh ....................... 709/226 |
| 2003/0195962 A1 | 10/2003 | Kikuchi et al. |
| 2003/0236815 A1* | 12/2003 | Brenner et al. .......... 709/104 |
| 2005/0033809 A1 | 2/2005 | McCarthy et al. |
| 2005/0081200 A1 | 4/2005 | Rutten et al. |
| 2005/0102676 A1 | 5/2005 | Forrester |
| 2005/0114480 A1 | 5/2005 | Ramamoorthy |
| 2006/0129684 A1 | 6/2006 | Datta |
| 2006/0143283 A1 | 6/2006 | Makofka |
| 2006/0195508 A1 | 8/2006 | Bernardin et al. |
| 2006/0212597 A1 | 9/2006 | Shimada |
| 2007/0124476 A1 | 5/2007 | Oesterreicher et al. |
| 2007/0174831 A1 | 7/2007 | Lee et al. |

FOREIGN PATENT DOCUMENTS

| | | |
|---|---|---|
| CN | 1592228 A | 3/2005 |
| CN | 1751302 A | 3/2006 |
| CN | 1835453 A | 9/2006 |
| CN | 1852209 A | 10/2006 |
| JP | 08044678 | 2/1996 |
| JP | 2000242614 | 9/2000 |
| JP | 2003178041 | 6/2003 |
| WO | WO0113227 A2 | 2/2001 |
| WO | WO0133687 A1 | 5/2001 |

OTHER PUBLICATIONS

Efe, K. et al, "Minimizing Control Overheads in Adaptive Load Sharing", 9th International Conference on Distributed Computing Systems, vol. CONF. 9, Jun. 5, 1989, 9 pages.

PCT International Search Report and Written Opinion for PCT Application No. PCT/US08/52310, mailed on Jul. 14, 2008, 9 pgs.

The Chinese Office Action mailed Oct. 31, 2011 for Chinese patent application No. 200710002961.6, a counterpart foreign application of U.S. Appl. No. 11/997,351, 5 pages.

The Chinese Office Action mailed Jul. 31, 2009 for Chinese patent application No. 200710002961.6, a counterpart foreign application of U.S. Appl. No. 11/997,351, 9 pages.

Translated copy of the Japanese Office Action mailed Nov. 2, 2012 for Japanese patent application No. 2009-548390, a counterpart foreign application of U.S. Appl. No. 11/997,351, 11 pages.

Japanese Office Action mailed Apr. 5, 2013 for Japanese patent application No. 2009-548390, a counterpart foreign application of U.S. Appl. No. 11/997,351, 5 pages.

* cited by examiner

DISTRIBUTED TASK SYSTEM AND DISTRIBUTED TASK MANAGEMENT METHOD

RELATED APPLICATIONS

This application is a national stage application of international patent application PCT/US08/52310, filed Jan. 29, 2008, claiming priority from Chinese patent application, Application No. 200710002961.6, filed Jan. 30, 2007, both entitled "DISTRIBUTED TASK SYSTEM AND DISTRIBUTED TASK MANAGEMENT METHOD".

BACKGROUND

This disclosure relates to the fields of computer task scheduling and tasking strategies, and in particular to a distributed task system and a distributed task management method.

In computer technologies, a task is a job executed according to a preset strategy. For instance, in Windows task system, a task can be set as "automatic shutdown of the system at 12:50 AM." At 12:50 AM, the system executes this task and completes the job of an automatic shutdown. In a computer program, a task may be a subroutine called in the program. Furthermore, in a more complex computing environment, a task may be a separate job in a great number of computing jobs either related or not related to each other.

At present, most task systems are single systems. The processing abilities of a single system are very limited. As the complexity and the precision requirement of the tasks continue to increase, the requirement on the processing ability of the task system also increases; hence single systems can no longer satisfy user demands.

In order to increase the processing abilities of task systems, distributed task system is used. Using a distributed task system, a large problem can be divided into many small problems which are distributed to many computers. For example, distributed computing is a method of computer processing in which different parts of a program are run simultaneously on two or more computers that are communicating with each other over a network.

A distributed task system usually has a task strategy unit and a group of task execution units. Under the control of the task strategy unit, each task execution unit takes up one or more of the tasks that need to be processed. In a distributed task system, it is usually required that a task be performed by only one task execution unit within a unit tasking time. This ensures that tasks are executed linearly in the distributed task system. It may be considered an erroneous operation for two task execution units to receive from the task strategy unit an authorization for executing the same task at the same time.

FIG. 1 shows a type of distributed task system in current technology. This system includes a task strategy unit 110 and N task execution units 120. The task strategy unit 110 communicates with each task execution unit 120. The task strategy unit 110 assigns task to one of the task execution units 120, and monitors and manages each task execution unit 120. Task execution unit 120 performs the task assigned from the task strategy unit 110 and reports its status to the task strategy unit 110. The task strategy unit 110 can extend the task execution units through Remote Procedure Calls (RPC) to achieve the processing abilities of a multi-server system.

However, in the present distributed task systems as shown in FIG. 1, the task execution units 120 are passively called for service and have little to none participation in the task distribution and task strategy, which are primarily done by task strategy unit 110 alone. This can be disadvantageous because when there are a large number of tasks need for execution, and especially when long-duration tasks and short-duration tasks are mixed together, the control of the task strategy unit 110 over the task execution units 120 would become weaker and the task execution units 120 may even become out of control.

SUMMARY

This disclosure describes a distributed task management method, which is used to overcome the limitation that the task execution units can only be called to function passively and cannot perform self-balancing acts to assist the task distribution of the system. Instead of being merely passively called by the task transaction server to execute a task, the task server in the presently disclosed system performs self-balancing according to task execution conditions and task server's operation conditions. The task transaction server receives task requests from the task server, records the execution conditions, and provides feedback to the task server, while the task server executes the task according to the received feedback and the operation conditions of the task server.

In one embodiment, the task server has a self-balancing unit that sends a task request to the task transaction server, receives the feedback from the task transaction server, and triggers a task execution unit of the task server to perform the task according to the feedback. The task execution unit connects with the self-balancing unit and performs the task under the control of self-balancing unit. The task transaction server determines, according to the execution conditions of the task, if the task server can execute the task, and then sends feedback to the task server. When the feedback indicates that the task server can perform the task, the self-balancing unit of the task server further determines whether the task server is busy, and if not busy, triggers the task execution unit of the task server to execute the task. If the task server is busy, it sends a task check message to the task transaction server. Upon receiving the task check message, the task transaction server checks whether any other task server is requesting for this task and sends the check result to the self-balancing unit.

The task server may be considered to be busy if any or a combination of the following conditions are met: the current number of threads is greater than or equal to a preset bound for the number of threads; the current number of long-duration threads is greater than or equal to a preset bound for the number of long-duration threads; and an execution encumbrance value of the task server is greater than or equal to a preset threshold.

The task server may further include a task strategy unit connecting with the self-balancing unit and used to trigger the self-balancing unit to send the task request.

Another aspect of this disclosure relates to a distributed task management method. According to one embodiment of the method, a task server sends a task request to a task transaction server, which determines whether the task server can perform the task based on recorded execution conditions of the task, and sends the result to the task server. The execution conditions of the task may include such information as the identity of the requester or executor of the task, previous task execution time of the task and the task name. If the result of the determination is affirmative (i.e., the server can perform the task), the task server may perform the task. After sending the task request to the task transaction server, the task server may begin execution of the task if it receives from the task transaction server a feedback within a first time interval. The task server sends another task request if it does not receive any feedback within the first time interval. The task server abandons the request for the task if it does not receive from the task transaction server a feedback within a second time interval.

According to an exemplary process of determining whether the task can be performed by the task server, the task transaction server checks the execution conditions of a task requested by a task server. If the execution conditions indicate that another task server is presently executing the same task, the task transaction server may decide that the requesting task server cannot perform the requested task. If no other task server is presently executing the task, the task transaction server may decide that the requesting task server can execute the requested task.

In one embodiment of the method, the task server checks itself to determine whether it is busy. If not busy, the task server performs the requested task. If busy, the task server sends a task check message to request the task transaction server to check if there is another task server requesting the same task and send the check result to the self-balancing unit of the requesting task server. If the check result is affirmative, the requesting task server abandons the task request. Otherwise, the task server may execute the task.

In order to determine whether the task server is busy, the task server may determine whether the current number of task threads is greater than or equal to a preset bound for the number of threads. If yes, the task server is considered busy. Alternatively or additionally, the task server may also determine whether the current number of long-duration threads is greater than or equal to a preset bound for the number of long-duration task threads. If yes, the task server is considered busy. In one embodiment, the task server determines whether it is busy by estimating an execution encumbrance value of the task server according to CPU utilization rate, the current number of threads and the current number of long-duration threads. If the execution encumbrance value is greater than or equal to a preset threshold (e.g., 1.0), the task server is considered busy.

To perform the requested task, the task server obtains data for the task being executed, groups the data into multiple data groups according to characteristics of the data, and processes each data group.

The system and method disclosed herein help to remove the limitation that the task execution units (e.g., task servers) can only be called for service passively and cannot perform self-balancing acts. Compared with the existing technologies, exemplary embodiments of the distributed task system and method may have the following advantages. In the exemplary embodiments disclosed herein, the task server uses a self-balancing unit to examine its operating condition. If the task server is busy, it may transfer the task to another task server for execution, thus achieving task server's self-balance. In the self-balancing process, the task server either initiates or actively assists the task transaction server to transfer the task to another task server for execution, rather than merely passively wait for management instructions from the task transaction server. Using this mechanism, when there are a large number of tasks need to be executed, and even when long-duration tasks and short-duration tasks are mixed together, the self-balancing unit can effectively control its task execution unit (e.g., a task server).

Moreover, exemplary embodiments disclosed herein employ a task transaction server which provides feedback in response to the task requests of the task server. The feedback is based the execution conditions of the requested task to ensures the linear execution of the task.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The distributed task system and distributed task management method are described in further detail below using the figures and exemplary embodiments.

Figure 1:
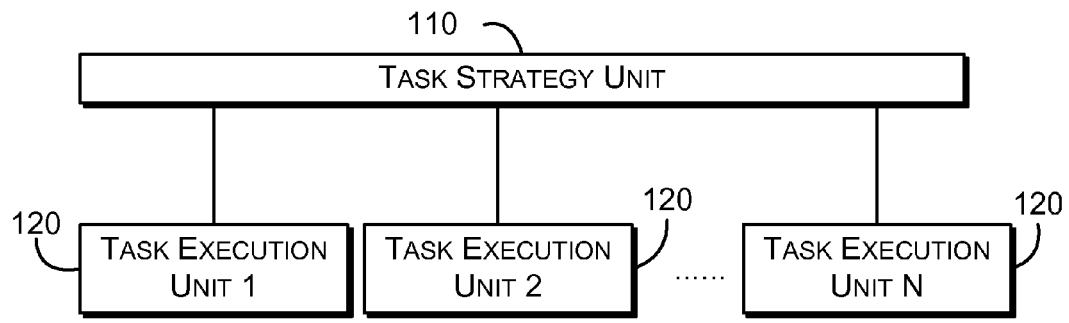
FIG. 1 is a diagram illustrating a distributed task system using an existing technology.
Figure 2:
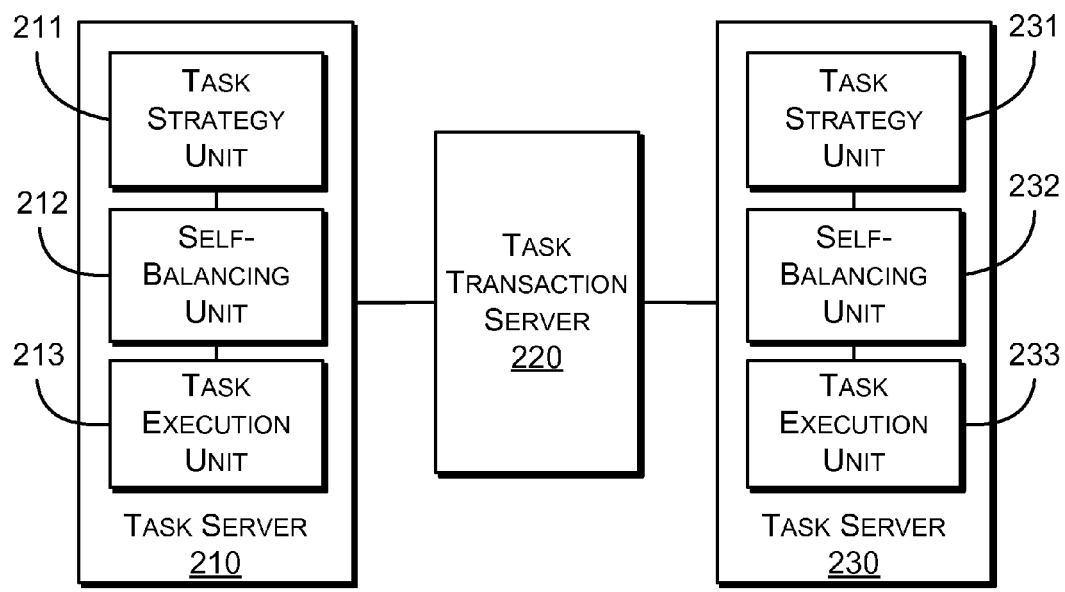
FIG. 2 is a diagram illustrating an exemplary distributed task system in accordance with the present description.

FIG. 2 shows an example of a distributed task system in accordance with the present disclosure. This system has task servers 210 and 230 and task transaction server 220, where task transaction server 220 connects separately with task server 210 and task server 230. Task transaction server 220 is used to receive task requests from task server 210 and task server 230, provide feedbacks to task server 210 and task server 230, and record execution conditions of each task. The execution condition of a task may include such information as the identity of the requester or the executor of the task (i.e., which task server requests for the task, which task server executes the task, which and how many executors in a task server are assigned to execute the task, etc.), previous task execution time and task name. Task server 210 and task server 230 each send task request to task transaction server 220 and execute the respective task according to the feedback from task transaction server 220.

It is appreciated that task transaction server 220 and task servers 210 and 230 may represent any computing device suitable for their respective purpose described herein, and are not limited to a real server computer, nor limited to a standalone physical computing device.

Task server 210 further includes task strategy unit 211, self-balancing unit 212 and task execution unit 213, wherein self-balancing unit 212 connects with task strategy unit 211 and task execution unit 213. Likewise, 230 further includes task strategy unit 231, self-balancing unit 232 and task execution unit 233, wherein self-balancing unit 232 connects with task strategy unit 231 and task execution unit 233. In the following, task server 210 is described in further detail for the purpose of illustration. The description is also applicable to task server 230. It is also appreciated that the distributed task system in FIG. 2 can have any number of task servers similar to task servers 210 and 230.

Task strategy unit 211 of task server 210 is used to trigger self-balancing unit 212 to send a task request. Self-balancing unit 212 is used to send the task request to task transaction server 220, and receive a feedback from task transaction server 220. When the feedback indicates that task server 210 can execute the task, self-balancing unit 212 checks whether task server 210 is busy. If task server 210 is not busy, self-balancing unit 212 may instruct task execution unit 213 to execute the requested task. If task server 210 is busy, self-balancing unit 212 sends a task check message to task transaction server 220 for further determination. Upon receiving the task check message, transaction server 220 checks if there is another task server (e.g., task server 230) requesting for the same task, and returns the check result to self-balancing unit 212. If the result is affirmative (i.e., another task server is requesting for the task), task server 210 may abandon its request for the task and let task transaction server 220 accept the request from the other task server (e.g., task server 230) to execute the task. If the result is negative (i.e., no other task server is requesting for the task), self-balancing unit 212 may instruct task execution unit 213 to perform the task anyway when task server 210 is able to execute the task.

A busy condition of task server 210 may be defined in a variety of ways based on the characteristics of the distributed task system. For example, a busy condition may be one in which the current number of threads (including all threads such as long-duration threads and short-direction threads) of task server 210 is greater than or equal to a preset bound for the number of threads; the current number of long-duration threads is greater than or equal to a preset bound for the number of long-duration threads; or an execution encumbrance value of task server 210 is greater than or equal to a preset threshold (e.g., 1.0). Any combination of these condition factors, and other suitable condition factors, may be used to define a busy condition of task server 210.

For instance, the preset bound for the number of threads in task server 210 may be five hundred. If the current number of threads is five hundred, the current number of threads is equal to the preset bound for the number of threads, and therefore task server 210 is considered to be in a busy state and cannot execute an additional task.

For another instance, the preset bound for the number of long-duration threads of task server 210 may be five. If the current number of long-duration threads is five, the current number of long-duration threads is equal to the preset bound for the number of long-duration threads, and therefore task server 210 is considered to be in a busy state and cannot execute an additional task.

Execution encumbrance of task server 210 may be estimated in a variety of ways suitable to the characteristics of the distributed system. In one embodiment, the overall operation condition of task server 210 may be measured by an execution encumbrance estimated by CPU utilization rate and a combination of the above-described condition factors.

For example, the execution encumbrance value of task server 210 may be obtained according to the following formula:

$$EC = \text{CPU utilization rate} \times W_1 + NT_{1d} \times W_2/NT_{1do} + NT \times W_3/NT_0,$$

where EC is execution encumbrance of task server 210, $NT_{1d}$ is the current number of long-duration threads, $NT_{1do}$ is the preset bound for the number of long-duration threads, NT is the current number of all threads (long-duration and short-direction), and $NT_0$ is the preset bound for the number of all threads, and $W_1$, $W_2$ and $W_3$ are weights assigned to each condition factor, and may be obtained empirically. $W_1$, $W_2$ and $W_3$ may or may not be normalized such that $W_1 + W_2 + W_3 = 1.0$. Preferably, $W_1$, $W_2$ and $W_3$ are empirically selected such that an execution encumbrance value of 1.0 indicates a threshold above which the task server is considered over occupied (i.e., busy) and not available for an additional task.

For the purpose of illustration, assume the preset bound for the number of threads of task server 210 is five hundred, and the preset bound for the number of long-duration threads is five. If the current CPU utilization rate of task server 210 is 85%, the current number of threads is one hundred, the current number of long-duration threads is three, and $W_1$, $W_2$ and $W_3$ are 0.80, 0.75 and 0.40 respectively, the current execution encumbrance value of task server can be estimated as:

$$EC = 80\% \times 0.80 + 3 \times 0.75/5 + 100 \times 0.40/500 = 0.68 + 0.45 + 0.08 = 1.21.$$

The above $W_1$, $W_2$ and $W_3$ are calibrated such that an execution encumbrance value greater than 1.0 indicates a busy status. Since the above-estimated execution encumbrance value is greater than 1.0, task server 210 is considered to be in a busy state and cannot execute additional tasks. The above exemplary values of weights $W_1$, $W_2$ and $W_3$ (0.80, 0.75 and 0.40, respectively) are obtained empirically, and can be modified according to the changes in hardware and the operating system.

Consider another example in which the preset bound for the number of threads of task server 210 is five hundred and the preset bound for the number of long-duration threads is five. If the current CPU utilization rate of task server 210 is 80%, the current number of long-duration threads is two, and the current number of threads is fifty, the execution encumbrance is estimated as:

$$\text{current execution encumbrance value} = 80\% \times 0.8 + 2 \times 0.75/5 + 50 \times 0.40/500 = 0.64 + 0.3 + 0.04 = 0.98 < 1.$$

Because the current execution encumbrance value is less than 1.0, task server 210 is considered as being not in a busy state, and therefore can take up an additional task. However, if one more long-duration thread is executed, the current number of long-duration threads becomes three, and accordingly the current execution encumbrance value $= 80\% \times 0.8 + 3 \times 0.75/5 + 50 \times 0.40/500 = 0.64 + 0.45 + 0.04 = 1.13 > 1$. Task server 210 thus turns into a busy state. That is, task server 210 could take up at most one additional long-duration thread without turning busy under this circumstance.

In contrast, if one more short-duration thread is executed, the current execution encumbrance value $= 80\% \times 0.8 + 2 \times 0.75/5 + 51 \times 0.40/500 = 0.64 + 0.3 + 0.0408 = 0.9808 < 1$. Therefore, task server 210 is still not in a busy state after taking up one additional short-duration task.

As shown in the above examples, the differential treatment of long-duration tasks and short-duration tasks in estimating the execution encumbrance of task server enables the task server to perform effective self-balancing with flexibility.

Figure 3:
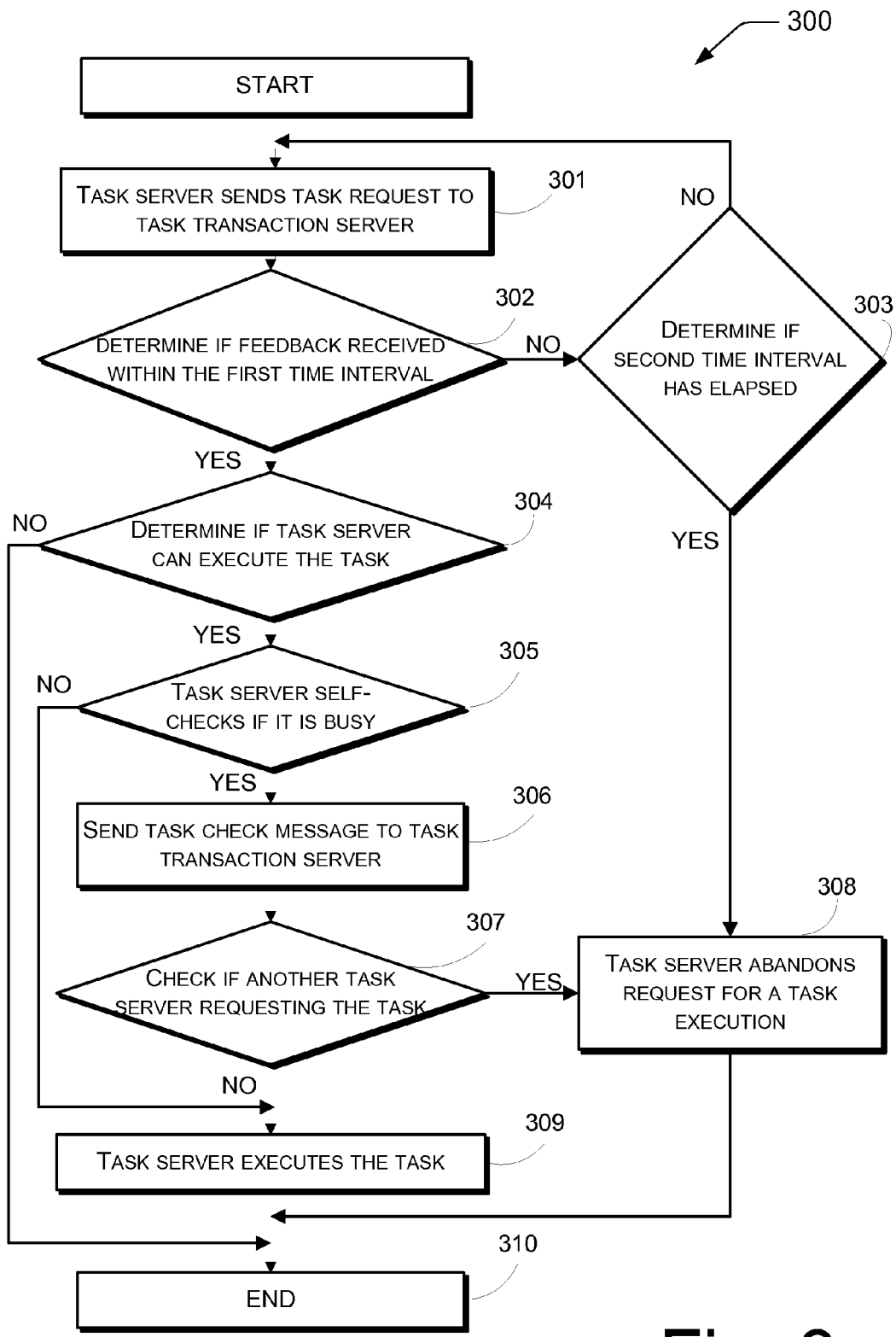
FIG. 3 is flowchart of an exemplary distributed task management method in accordance with the present description.

FIG. 3 shows a flowchart of an exemplary process using the distributed task system in FIG. 2. In this description, the order in which a process is described is not intended to be construed as a limitation, and any number of the described process blocks may be combined in any order to implement the method, or an alternate method.

In the exemplary process 300, a task server sends a task request to task transaction server 220. The task transaction server 220 then determines if the requesting task server can perform the task based on the recorded execution conditions of the task, and sends the result to the requesting task server. If the check result is affirmative, the requesting task server executes the task. Any task server in a distributed task system disclosed herein may be a requesting task server. For the purpose of illustration, task server 210 in FIG. 2 is assumed in the following to be the requesting task server 220 for execution of task A. An exemplary embodiment of the process is described as follows.

At block 301, task server 210 sends a task request to task transaction server 220. Task strategy unit 211 triggers self-balancing unit 212 to send a request to task transaction server 220 for executing task A.

At block 302, task server 210 determines if a feedback has been received from task transaction server 220 within a preset first time interval. If yes, the process goes to block 304. If not, the process goes to block 303. The preset first time interval can be any practical time suitable for the distributed task system and its management.

At block 303, task server 210 determines if a second time interval elapses without receiving a feedback from task transaction server 220. If yes, the process proceeds to block 308 to abandon the task request. If not, the process returns to block 301. The preset second time interval can be any practical time suitable for the distributed system and its management. In general, if the second time interval counts from the beginning of the process 300, as the first time interval does, the second time interval should be longer than the first time interval. If the second time interval counts from the end of the first time interval, the second time interval can be any suitable length. For example, the second time interval maybe 30 seconds, or a fraction (e.g., ⅓) of a scheduling interval.

At block 304, task transaction server 220 determines if task server 210 can execute task A and sends a feedback to task server 210. If yes, the process proceeds to block 305. Otherwise, the process ends at block 310. The determination may be based on the record of task execution conditions.

To determine whether task server 210 can execute task A, task transaction server 220 checks the task execution conditions of task A, and task execution conditions of any other task if necessary. The execution condition of a task may be characterized by such information as the identity of the requester or executor of the task (i.e., which task server requests for the task, which task server executes the task, which and how many executors in the task server are assigned to execute the task, etc.), previous task execution time and task name. For example, if it is determined that a different task server (task server 230) is currently executing task A, task transaction server 220 may decide that task server 210 cannot execute task A at the same time. If no other task server is currently executing task A, task server 210 can execute task A.

If it is determined that task server 210 cannot execute task A, the process 300 may end at block 310. But if it is determined that task server 210 can execute task A (because, e.g. task A is not being executed by task server 230), task transaction server 220 then sends a feedback to task server 210 to indicate that it can execute task A, and the process proceeds to block 305.

At block 305, self-balancing unit 212 examines whether task server 210 is busy. If yes, the process proceeds to block 306. Otherwise, the process proceeds to block 309. Self-balancing unit 212 may determine whether task server 210 is busy by considering several factors, including:

(i) whether the current number of threads of task server 210 is greater than or equal to the preset bound for the number of threads; if yes, task server 210 is busy;

(ii) whether the current number of long-duration threads is greater than or equal to the preset bound for the number of long-duration threads; if yes, task server 210 is busy; and (iii) whether the execution encumbrance value of task server 210 is greater than or equal to the preset threshold (e.g., 1); if yes, task server 210 is busy.

The execution encumbrance value of task server 210 can be computed according to its CPU utilization rate, the current number of threads and the current number of long-duration threads.

Consider an example of process 300 may have the following conditions:

the preset bound for the number of threads of task server 210 is five hundred;

the preset bound for the number of long-duration threads is five;

the current CPU utilization rate of task server 210 is 85%;

the current number of long-duration threads is three;

the current number of threads is one hundred.

The execution encumbrance value of task server 210 can be computed by the following formula:

$$\text{execution encumbrance value} = \text{CPU utilization rate} \times 0.8 + \text{number of long-duration threads} \times 0.75/5 + \text{number of threads} \times 0.4/500.$$

According to the above formula, the current execution encumbrance value of task server 210 is estimated as follows:

$$85\% \times 0.8 + 3 \times 0.75/5 + 100 \times 0.4/500 = 0.68 + 0.45 + 0.08 = 1.21.$$

Since the above execution encumbrance value is greater than 1.0, task server 210 is considered to be in a busy state. The process therefore proceeds to block 306.

The weight values 0.8, 0.75 and 0.4 used in the above formula are obtained empirically. They can be modified according to changes in hardware and the operating system of the distributed task system.

At block 306, self-balancing unit 212 sends a check message for task A to task transaction server 220. The check message may request task transaction server 220 to check if there is any other task server also requesting the execution of task A. The check message may or may not inform task transaction server 220 of the current busy status of task server 210.

At block 307, task transaction server 220 checks whether another task server (e.g., task server 230) has applied or is applying for execution of task A. If yes, the process proceeds to block 308. Otherwise, the process may proceed to block 309 to instruct task server 210 to execute the requested task A. Due to the busy status of task server 210, the execution of task A may be delayed. Alternatively, task transaction server 220 may resort to other resources that can execute task A.

At block 308, if it has been determined that another task server is available to execute task A, the busy task server 210 may cancel the request for execution of task A, and ends the process and 310.

At block 309, self-balancing unit 212 triggers task execution unit 213 to execute task A. The process 300 arrives at block 309 in two exemplary scenarios. In the first scenario, it has been determined that task server 210 can execute task A and is further in a non-busy state, so task server 210 proceeds to execute the requested task A. In the second scenario, although it has been determined that task server 210 can execute the task, task server 210 is found to be temporarily busy. But at the same time there may be no other task servers requesting for executing task A. In this scenario, it may be reasonable to instruct task server 210 to execute task A anyway.

Figure 4:
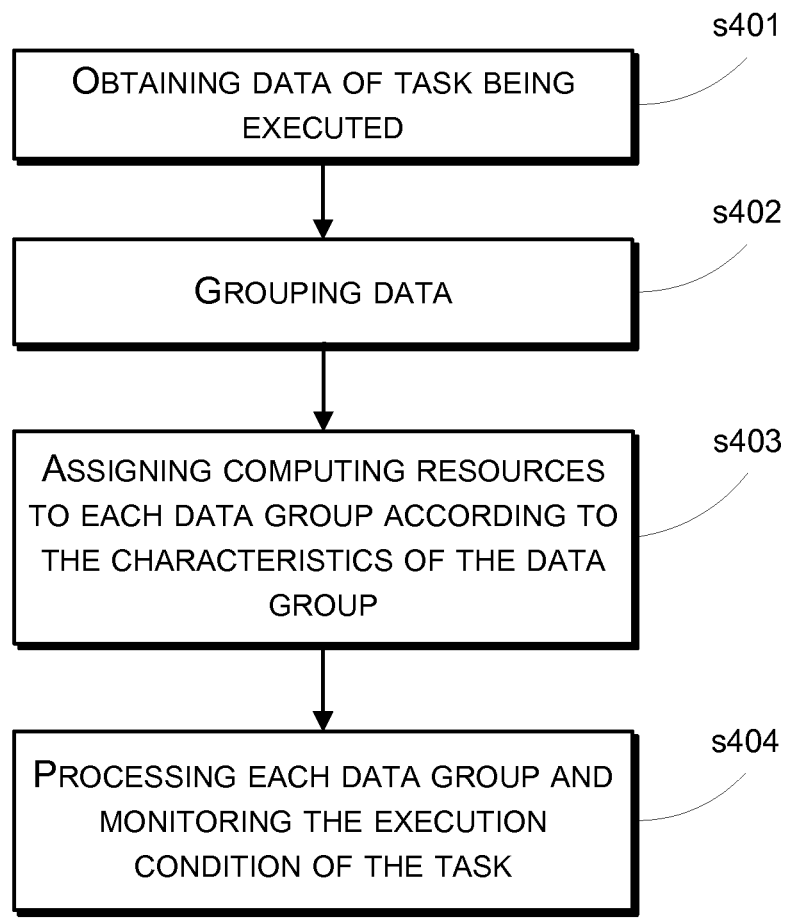
FIG. 4 is a flowchart of an exemplary pre-process of the task execution in FIG. 3.

FIG. 4 shows a flowchart of an exemplary pre-process before executing task A in FIG. 3. Task execution unit 213 of task server 210 performs the pre-process before it executes task A.

At block 401, task execution unit 213 receives data of task A. The data is to be processed when executing task A.

At block 402, task execution unit 213 groups the received data into data groups according to the type of the data and execution time(s) necessary for processing the data.

At block 403, task execution unit 213 assigns actual computing resources such as executors to each data group to process the data group. A task server usually has multiple executors available to execute a certain task. Task execution unit 213 may dynamically determine a suitable number of executors to execute each data group of task A, according to the characteristics of each data group such as the amount of data that needs to be processed and the time needed to process the data. For example, if a certain data group has one thousand units of data and need to be completed within one minute, task execution unit 213 may decide that twenty executors are needed to process this data group. Accordingly, task execution unit 213 assigns a sufficient number (e.g. twenty) of executors to process this data group if the needed executors are available.

At block 404, execution unit 213 processes each group of data and monitors the execution conditions of the task. As indicated at block 403, execution unit 213 may call different executors to run different groups of data, such that the executors called are optimally suitable for running the corresponding group of data. Execution unit 213 may also monitor various execution conditions of task A. For instance, if execution unit 213 detects that the task (or a certain data group of the task) has taken longer than maximum allowed execution time, execution unit 213 may make a mark to indicate that task execution is in an abnormal state.

The above-described exemplary embodiments are able to accomplish self-balancing using self-balancing unit 212, which examines whether task server 210 is busy, and transfers the task to another task server for execution if task server 210 has been determined to be busy. Moreover, task transaction server 220 provides feedback in response to the task request of task server 210. The feedback is based on the execution conditions of each task to ensure the linear execution of the requested task.

Implementation Environment

The above-described techniques may be implemented with the help of a computing device, such as a server, a personal computer (PC) or a portable device having a computing unit.

Figure 5:
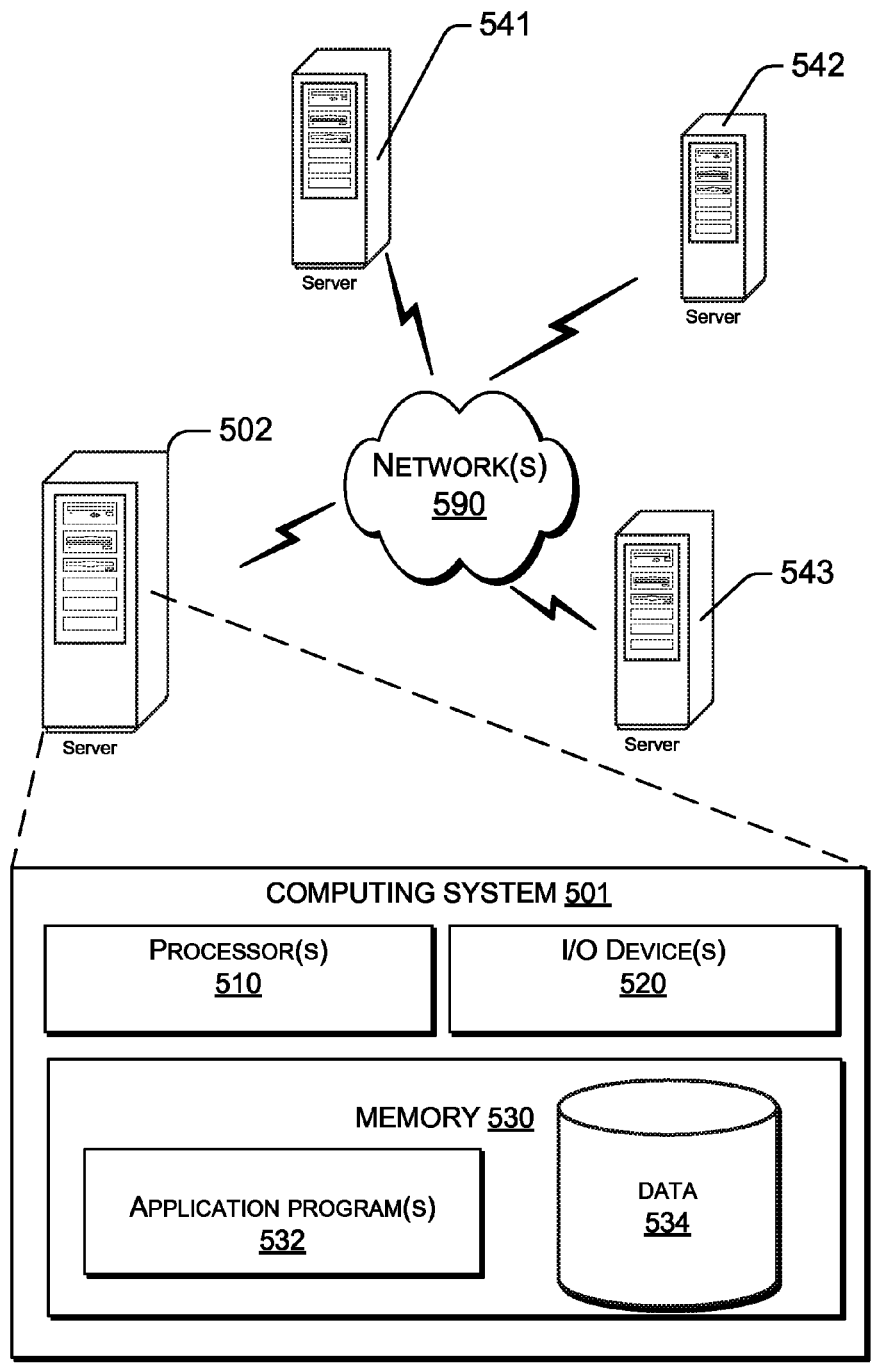
FIG. 5 shows an exemplary environment for implementing the system and method of the present description.

FIG. 5 shows an exemplary environment for implementing the method of the present disclosure. Computing system 501 is implemented with computing device 502 which includes processor(s) 510, I/O devices 520, computer readable media (e.g., memory) 530, and network interface (not shown). Other computing devices such as 541, 542 and 543 may have similar components. The computer device 502 is connected to servers 541, 542 and 543 through network(s) 590. Each computing device 502, 541, 542 and 543 may be used to serve as a task transaction server or a task server. For example, computing device 502 may serve as a task transaction server, and each computer device 541, 542 and 543 may serve as a task server.

The computer readable media 530 stores application program modules 532 and data 534 (such as data of task execution conditions). Application program modules 532 contain instructions which, when executed by processor(s) 510, cause the processor(s) 510 to perform actions of a process described herein (e.g., the processes of FIGS. 3-4).

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

Especially, each computer device 502, 541, 542 and 543 may be a server computer, or a cluster of such server computers, connected through network(s) 590, which may either be Internet or an intranet. The present disclosed distributed task system thus configured may be used to handle a variety of computational tasks, including being used as part of an e-commerce system used for processing online commercial transactions.

The present distributed task system and distributed task management method can be used in combination with any existing distributed task system and method. For example, Remote Procedure Call (RPC) may be used in combination with the present disclosed techniques. RPC allows a computer program to cause a subroutine or procedure to execute in another address space (commonly on another computer on a shared network) without the programmer explicitly coding the details for this remote interaction.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A distributed task system, comprising:
a task transaction server having a memory with instructions stored therein and a processor, the instructions, when executed by the processor, provide a task-execution-feedback in response to receiving a task-execution-request that includes an execution condition for a given task and record the execution condition for the given task; and
at least one task server having a self-balancing unit and a task execution unit, wherein the self-balancing unit is configured to send the task-execution-request to the task transaction server, receive the task-execution-feedback from the task transaction server, and trigger the task execution unit to execute the given task according to the task-execution-feedback received from the task transaction server; and
wherein the task execution unit is connected with the self-balancing unit and is configured to execute the task, wherein the self-balancing unit is configured to check whether the task server is busy when the task-execution-feedback indicates that the task server can execute the task, and to further send a task check message to the task transaction server if the task server is busy, and wherein the task transaction server is configured to subsequently check if another task server is requesting for the task, and to return a result of checking to the self-balancing unit, wherein the system is configured to determine an execution encumbrance of the at least one task server at least partially based on a current number of task threads and a current number of long-duration task threads, and wherein the at least one task server is considered to be busy when the execution encumbrance of the task server has a value greater than or equal to a preset threshold.

2. The distributed task system as recited in claim 1, wherein the task execution unit is configured to execute the task under control of the self-balancing unit.

3. The distributed task system as recited in claim 1, wherein the at least one task server further comprises:
a task strategy unit connected with the self-balancing unit and used to trigger the self-balancing unit to send the task request.

4. The distributed task system as recited in claim 1, wherein the system is configured to determine a current number of task threads and a current number of long-duration task threads, and wherein the task server is considered to be busy when at least one the following conditions is met:
the current number of threads is greater than or equal to a preset bound for number of threads; and
the current number of long-duration threads is greater than or equal to a preset bound for number of long-duration threads.

5. The distributed task system as recited in claim 1, wherein the system is configured to obtain execution data of the task, group the execution data into a plurality of data groups according to the execution data and the task's execution times, and process each data group.

6. The distributed task system as recited in claim 1, wherein the task transaction server and the at least one task server of are connected through a network.

7. The distributed task system as recited in claim 1, wherein the task transaction server and the at least one task server are part of an e-commerce system used for processing online commercial transactions.

8. A distributed task management method, comprising:
sending a task-execution-request from a task server to a task transaction server, wherein the task server comprises a self-balancing unit and a task execution unit;
determining by the task transaction server whether the task server can execute a given task based on an execution condition of the given task, and sending a determined result to the task server;
checking, by the self-balancing unit, whether the task server is busy by computing an execution encumbrance value of the task server based on CPU utilization rate, a current number of threads and a current number of long-duration threads and concluding that the task server is busy if the execution encumbrance value is at or above a preset threshold, wherein checking is performed when the determined result indicates that the task server can execute the given task;
sending, by the self-balancing unit, a task check message to the task transaction server if the task server is busy;
checking by the task transaction server whether another task server is requesting for the given task, and sending a check result to the task server; and
abandoning the given task by the task server if the check result is affirmative, or otherwise executing the given task by the task server.

9. The distributed task management method as recited in claim 8, wherein the task server executes the given task if a task-execution-feedback is received from the task transaction server within a first time interval after sending the task-execution-request to the task transaction server by the task server, or otherwise sends another task-execution-request to the task transaction server.

10. The distributed task management method as recited in claim 9, further comprising:
abandoning the given task if no task-execution-feedback is received from the task transaction server within a second time interval.

11. The distributed task management method as recited in claim 8, wherein determining by the task transaction server whether the task server can execute the given task comprises:
checking by the task transaction server the execution condition of the given task; and
concluding that the task server cannot execute the given task if the given task is being presently executed by another task server, or otherwise concluding that the task server can execute the task.

12. The distributed task management method as recited in claim 8, wherein checking whether the task server is busy comprises:
determining whether a current number of threads is greater than or equal to a preset bound, and if affirmative, concluding that the task server is busy.

13. The distributed task management method as recited in claim 8, wherein checking whether the task server is busy comprises:
determining whether a current number of long-duration threads is greater than or equal to a preset bound, and if affirmative, concluding that the task server is busy.

14. The distributed task management method as recited in claim 8, wherein executing the given task by the task server comprises:
obtaining data of the given task;
grouping the data into a plurality of data groups according to amount of data that needs to be processed and data processing time; and
processing each data group.

* * * * *